(12) United States Patent
DeMarco et al.

(10) Patent No.: US 9,428,638 B2
(45) Date of Patent: Aug. 30, 2016

(54) STRONG POLYOLEFIN-BASED THERMOPLASTIC ELASTOMERIC FILMS AND METHODS OF MAKING

(71) Applicant: Kimberly-Clark Worldwide, Inc., Neenah, WI (US)

(72) Inventors: Alphonse Carl DeMarco, Greenville, WI (US); Peiguang Zhou, Appleton, WI (US); Davis Dang Hoang Nhan, Appleton, WI (US); Oomman Painummoottil Thomas, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 14/134,755

(22) Filed: Dec. 19, 2013

(65) Prior Publication Data

US 2015/0175793 A1 Jun. 25, 2015

(51) Int. Cl.
*C08K 3/34* (2006.01)
*C08L 25/08* (2006.01)
*C08L 23/02* (2006.01)
*C08L 53/02* (2006.01)
*C08J 5/18* (2006.01)
*C08L 23/14* (2006.01)
*C08L 23/10* (2006.01)

(52) U.S. Cl.
CPC .......... *C08L 25/08* (2013.01); *C08J 5/18* (2013.01); *C08L 23/02* (2013.01); *C08L 23/10* (2013.01); *C08L 23/14* (2013.01); *C08L 53/02* (2013.01)

(58) Field of Classification Search
USPC ........................................................ 524/445
See application file for complete search history.

(56) References Cited

U.S. PATENT DOCUMENTS

| | | | |
|---|---|---|---|
| 2,531,396 A | 11/1950 | Carter | |
| 4,081,502 A | 3/1978 | Blumel et al. | |
| 4,197,377 A | 4/1980 | Bohm et al. | |
| 4,657,802 A | 4/1987 | Morman | |
| 4,663,220 A | 5/1987 | Wisneski et al. | |
| 4,789,699 A | 12/1988 | Kieffer et al. | |
| 4,939,016 A | 7/1990 | Radwanski et al. | |
| 5,354,597 A | 10/1994 | Capik et al. | |
| 5,733,617 A | 3/1998 | Baduel | |
| 5,804,021 A | 9/1998 | Abuto et al. | |
| 5,861,074 A | 1/1999 | Wu | |
| 5,885,908 A | 3/1999 | Jaeger et al. | |
| H001798 H | 7/1999 | Modic | |
| H001808 H | 10/1999 | Djiauw et al. | |
| 6,372,067 B1 | 4/2002 | Kobayashi et al. | |
| 6,384,123 B1 * | 5/2002 | Young | 524/451 |
| H002096 H | 1/2004 | Erderly et al. | |
| 6,794,024 B1 * | 9/2004 | Walton et al. | 428/317.9 |
| 7,078,089 B2 | 7/2006 | Ellis et al. | |
| 7,291,382 B2 * | 11/2007 | Krueger et al. | 428/304.4 |
| 8,034,440 B2 | 10/2011 | Morman et al. | |
| 2002/0016122 A1 | 2/2002 | Curro et al. | |
| 2004/0122408 A1 | 6/2004 | Potnis et al. | |
| 2004/0122409 A1 | 6/2004 | Thomas et al. | |
| 2005/0043460 A1 | 2/2005 | McCormack et al. | |
| 2005/0148730 A1 | 7/2005 | Day et al. | |
| 2005/0148732 A1 | 7/2005 | Thomas et al. | |
| 2005/0282028 A1 | 12/2005 | Huber | |
| 2006/0135024 A1 * | 6/2006 | Thomas et al. | 442/394 |
| 2006/0216473 A1 | 9/2006 | Tomany et al. | |
| 2006/0286386 A1 | 12/2006 | Sabbagh et al. | |
| 2007/0078222 A1 | 4/2007 | Chang et al. | |
| 2007/0141303 A1 | 6/2007 | Steindorf | |
| 2007/0141352 A1 | 6/2007 | Calhoun et al. | |
| 2007/0155900 A1 | 7/2007 | Chang et al. | |
| 2008/0003910 A1 | 1/2008 | Hughes | |
| 2008/0132866 A1 | 6/2008 | Siqueira et al. | |
| 2008/0177242 A1 | 7/2008 | Chang et al. | |
| 2008/0207071 A1 | 8/2008 | Muslet et al. | |
| 2009/0163361 A1 | 6/2009 | Handlin et al. | |
| 2009/0258210 A1 | 10/2009 | Iyad et al. | |
| 2010/0081353 A1 | 4/2010 | Sabbagh et al. | |
| 2010/0267882 A1 * | 10/2010 | Clunk et al. | 524/445 |
| 2011/0160687 A1 | 6/2011 | Welch et al. | |
| 2012/0238162 A1 | 9/2012 | Muslet et al. | |
| 2012/0291949 A1 | 11/2012 | Thomas et al. | |
| 2013/0048204 A1 | 2/2013 | Chang et al. | |

FOREIGN PATENT DOCUMENTS

| | | | | |
|---|---|---|---|---|
| EP | 0682678 | * | 12/1998 | C08J 5/18 |
| KR | 100918290 B1 | | 9/2009 | |
| KR | 1020110076494 A | | 7/2011 | |
| KR | 1020120116160 A | | 10/2012 | |
| WO | 9418263 A | | 8/1994 | |
| WO | 9829239 A1 | | 7/1998 | |
| WO | 9925912 A1 | | 5/1999 | |

OTHER PUBLICATIONS

International Search Report and Written Opinion for PCT/IB2014/066731 (dated Apr. 14, 2015).
International Search Report and Written Opinion for PCT/IB2014/066729 (dated Apr. 8, 2015).
International Search Report and Written Opinion for PCT/IB2015/051661 (dated May 28, 2015).
International Search Report and Written Opinion issued for PCT/IB2015/055914 (dated Oct. 27, 2015), 9 pages.

* cited by examiner

*Primary Examiner* — Hui Chin
(74) *Attorney, Agent, or Firm* — Armstrong Teasdale LLP (57) ABSTRACT

Stronger thermoplastic elastomeric films having improved tensile strength and elastic properties are disclosed herein. The thermoplastic elastomeric films include a combination of polyolefin-based thermoplastic elastomers, styrenic block copolymers, and strength-enhancing agents. The films are suitably free of filler particles such as calcium carbonate.

20 Claims, 5 Drawing Sheets

STRONG POLYOLEFIN-BASED THERMOPLASTIC ELASTOMERIC FILMS AND METHODS OF MAKING

FIELD OF DISCLOSURE

The present disclosure is directed to stronger thermoplastic elastomeric films. The thermoplastic elastomeric films include a combination of polyolefin-based thermoplastic elastomers and styrenic block copolymers. In particularly suitable embodiments, the films further include strength-enhancing agents, such as inorganic clay. The films are suitably free of calcium carbonate.

Elastic laminates have conventionally been used to provide comfort and sufficient sealing functions in personal care products. For example, elastic laminates are used in side panels, ear attachments, and waist bands in diapers and training pants. In today's market, the elastic laminates are based on an elastic polymer laminated with a non-woven material as facing. These non-woven facing materials enhance the laminates' mechanical strength as elastic films are not alone typically strong enough to prevent breaking in case of the consumer overstretching the laminate. The materials additionally prevent elastic film blocking during high speed processing.

A stronger elastic film would thus shift the strength burden away from the facing materials. More particularly, there is a need in the art to prepare elastic film laminates having reduced or no facing materials. Accordingly, the present disclosure is directed to thermoplastic elastomeric films having increased elastic tensile strength.

BRIEF DESCRIPTION OF THE DISCLOSURE

A thermoplastic elastomeric film having an improved mechanical strength is disclosed. It has been surprisingly found that a stronger thermoplastic elastomeric film can be made by blending a thermoplastic elastomer, particularly, a polyolefin-based thermoplastic elastomer, and a styrenic block copolymer. In some embodiments, a strength-enhancing agent can further be included in the film to further increase strength of the resulting film.

Accordingly, in one aspect, the present disclosure is directed to a thermoplastic elastomeric film including a polyolefin-based thermoplastic elastomer, a styrenic block copolymer, and a strength-enhancing agent.

In another aspect, the present disclosure is directed to a thermoplastic elastomeric film including greater than 50% by weight polyolefin-based thermoplastic elastomer, from about 15% by weight to about 40% by weight styrenic block copolymer, and from about 2% by weight to about 10% by weight strength-enhancing agent.

In yet another aspect, the present disclosure is directed to a method of strengthening a thermoplastic elastomeric film. The method includes blending a polyolefin-based thermoplastic elastomer, a styrenic block copolymer, and an inorganic clay.

DETAILED DESCRIPTION

Definitions

As used herein, the term "personal care product" refers to diapers, training pants, swimwear, absorbent underpants, adult incontinence products, and feminine hygiene products, such as feminine care pads, napkins, and pantiliners.

As used herein, the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the terms "machine direction" or MD refers to the direction along the length of a fabric in the direction in which it is produced. The terms "cross machine direction," "cross directional," or CD refers to the direction across the width of the fabric, i.e., a direction generally perpendicular to the MD.

As used herein, the term "elastomeric" shall be interchangeable with the term "elastic" and refers to sheet material which, upon application of a stretching force, is stretchable in at least one direction (such as the CD direction), and which upon release of the stretching force contracts/returns to approximately its original dimension.

As used herein, the term "elastomer" refers to a polymer which is elastomeric.

As used herein, the term "thermoplastic" refers to a polymer which is capable of being melt processed.

As used herein, term "breathable" refers to a material which is permeable to water vapor. The water vapor transmission rate (WVTR) or moisture vapor transfer rate (MVTR) is measured in grams per square meter per 24 hours, and shall be considered equivalent indicators of breathability. The term "breathable" desirably refers to a material which is permeable to water vapor having a minimum WVTR of desirably about 100 g/m$^2$/24 hours, more suitably, greater than about 300 g/m$^2$/24 hours, and even more suitably, greater than about 1000 g/m$^2$/24 hours.

The WVTR of a fabric, in one aspect, gives an indication of how comfortable a fabric would be to wear. Often, personal care product applications of breathable materials suitably have higher WVTRs and, more typically, exceed about 1,200 g/m$^2$/24 hours, 1,500 g/m$^2$/24 hours, 1,800 g/m$^2$/24 hours, or even exceeding 2,000 g/m$^2$/24 hours.

As used herein, the terms "impermeable" or "non-breathable" refers to any material that does not fall within the definition of "breathable" above.

As used herein, the term "set" refers to retained elongation in a material sample following the elongation and recovery, i.e., after the material has been stretched and allowed to relax during a cycle test.

As used herein, the term "percent set" is the measure of the percent (%) amount elongation at which stress becomes zero in a stress-% elongation plot. A perfect elastic material such as a spring would have a zero % set since the retractive curve will pass through the origin.

As used herein, the value terms of "percent hysteresis" or "percent hysteresis loss" of a sample are used interchangeably and may be determined by first stretching the sample to the desired elongation and then allowing the sample to retract in a displacement or load controlled manner. The hysteresis is the loss of energy in a cyclic deformation. The percent hysteresis (% hysteresis) is calculated by integrating the area under the loading (AL) and unloading curves (AUL); taking their difference and dividing it by the area under the loading curves and multiplying by 100.

$$\% \text{ Hysteresis}=(AL-AUL)*100/(AL)$$

These measurements are performed using a "strip elongation test which is substantially in accordance with the specifications in ASTM D5459-95. Specifically, the test uses two clamps each having two jaws with each jaw having a facing in contact with the sample. The clamps hold the material in the same plane usually vertically, separated by 1 inch and move the cross head at a specific rate of extension. The sample size is 4 inches by ⅜ inches (101.6 mm by 9.525 mm) with a jaw facing height of 1 inch and width of 3 inches and at a cross-head displacement rate of 20 in/min. The specimen is clamped in a MTS (Mechanical Test Systems) electromechanical test frame which has data acquisition capability. The test is conducted at ambient condition both in cross direction and machine direction (CD & MD). Results are reported as an average of at least five specimens.

Thermoplastic Elastomeric Films

The present disclosure is directed to stronger thermoplastic elastomeric films. In suitable embodiments, the thermoplastic elastomeric film includes a combination of polyolefin-based thermoplastic elastomers and styrenic block copolymers.

As used herein, thermoplastic elastomer refers to polymeric materials that elongate and have less than 100% recovery. Examples of polyolefin-based thermoplastic elastomers suitable for use in the films of the present disclosure include, among others, a crystalline polyolefin, for example, a homopolymer or a copolymer of an α-olefin having 1 to 20 carbon atoms, and including 1 to 12 carbon atoms.

Examples of crystalline polyolefins include homopolymers and copolymers described below.

(1) Ethylene homopolymer

The ethylene homopolymer may be prepared by any one of a low-pressure process and a high-pressure process.

(2) Copolymers of ethylene and not more than 10% by mol of α-olefins other than ethylene or vinyl monomers such as vinyl acetate and ethyl acrylate; examples include ethylene octene copolymer, available as Engage 8407 or Engage 8842 (Dow Chemical, Houston, Tex.)

(3) Propylene homopolymer; examples include polypropylene impact copolymer PP7035E4 and polypropylene random copolymer PP9574E6 (Exxon Mobil, Houston, Tex.)

(4) Random copolymers of propylene and not more than 10% by mol of α-olefins other than propylene (5) Block copolymers of propylene and not more than 30% by mol of α-olefins other than propylene (6) 1-Butene homopolymer (7) Random copolymers of 1-butene and not more than 10% by mol of α-olefins other than 1-butene (8) 4-Methyl-1-pentene homopolymer (9) Random copolymers of 4-methyl-1-pentene and not more than 20% by mol of α-olefins other than 4-methyl-1-pentene Examples of the α-olefins include ethylene, propylene, 1-butene, 4-methyl-1-pentene, 1-hexene and 1-octene.

Exemplary commercially available polyolefin-based thermoplastic elastomers for use in the films of the present disclosure include VISTAMAXX™ (propylene-based elastomer, available from ExxonMobil Chemical, Houston, Tex.), INFUSE™ (olefin block copolymers, available from Dow Chemical Company, Midland, Mich.), VERSIFY™ (propylene-ethylene copolymers) such as VERSIFY™ 4200 and VERSIFY™ 4300 (Dow Chemical Company, Midland, Mich.), ENGAGE™ (ethylene octane copolymer, available from Dow Chemical, Houston, Tex.), and NOTIO 0040 and NOTIO 3560 (available from Mitsui Chemical (USA), New York, N.Y. In one particularly suitable embodiment, the polyolefin-based thermoplastic elastomer is VISTAMAXX™ 6102 FL.

In an alternative embodiment, the thermoplastic elastomer may be thermoplastic ester/ether elastomers or thermoplastic polyurethanes, including PEBAX® block amide elastomers (commercially available from Arkema, France).

The thermoplastic elastomeric films of the present disclosure include greater than 50% by weight thermoplastic elastomer, including greater than 55% by weight, including greater than 60% by weight, including greater than 65% by weight, including greater than 70% by weight, including greater than 75%, and including greater than 80% by weight thermoplastic elastomer. In suitable embodiments, the thermoplastic elastomeric film includes 50% by weight thermoplastic elastomer. In yet other suitable embodiments, the thermoplastic elastomeric film includes about 62% by weight thermoplastic elastomer. In yet other suitable embodiments, the thermoplastic elastomeric film includes about 65% by weight thermoplastic elastomer. In still other suitable embodiments, the thermoplastic elastomeric film includes about 82% by weight, or even about 83% by weight, thermoplastic elastomer.

In addition to the thermoplastic elastomers, the thermoplastic elastomeric film includes a styrenic block copolymer. It has unexpectedly been found that the addition of styrenic block copolymers provides improved mechanical strength to the film. Additionally, the combination of a thermoplastic elastomer and styrenic block copolymer allows for high speed processing. Based on these improved processing, functional and structural characteristics, the thermoplastic elastomeric films of the present disclosure allow for personal care products such as disposable diapers, training pants, and the like, to be made to have improved comfort, strength and sealing functions. More particularly, in some embodiments, the thermoplastic elastomeric films can be used as a single layer strong elastomeric film to provide strength while further allowing for reduced basis weight as less to no facing materials can be used in the personal care product. Further, the thermoplastic elastomeric films have improved poke-through performance. As used herein, "poke-through performance" generally refers to the durability or toughness of a film to resist tearing of the film during use, such as the ability of the film to resist a user poking through the film with his finger.

Exemplary styrenic block copolymers for use with the thermoplastic elastomers in the thermoplastic elastomeric films of the present disclosure include hydrogenated polyisoprene polymers such as styrene-ethylenepropylene-styrene (SEPS), styrene-ethylenepropylene-styrene-ethylenepropylene (SEPSEP), hydrogenated polybutadiene polymers such as styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), hydrogenated poly-isoprene/butadiene polymer such as styrene-ethylene-ethylenepropylene-styrene (SEEPS), and hydrogenated vinyl-polyisoprene/hydrogenated polyisoprene/polystyrene triblock polymers such as commercially available as HYBRAR™ 7311 (Kuraray America, Inc., Houston, Tex.), and combinations thereof. Polymer block configurations such as diblock, triblock, multiblock, star and radial are also contemplated in this disclosure. In some instances, higher molecular weight block copolymers may be desirable. Block copolymers are available from Kraton Polymers U.S. LLC of Houston, Tex. under the designations, for example, Kraton MD6716, Kraton D1102, Kraton SIBS D1102, Kraton D1184, Kraton FG1901, and Kraton FG1924, and Septon Company of America, Pasadena, Tex. under the designations Septon 8007, Septon V9827, and Septon 9618. Another potential supplier of such polymers includes Dynasol of Spain. In particular, Kraton MD6716 SEPS triblock polymer is particularly suitable for the present disclosure.

The thermoplastic elastomeric films of the present disclosure include from about 15% to about 40% by weight styrenic block copolymer, including about 30% by weight styrenic block copolymer.

Surprisingly, the thermoplastic elastomeric films of the present disclosure have a tensile strength that is 40% to about 100% greater than a thermoplastic elastomeric film without a styrenic block copolymer. In some embodiments, the films have a tensile strength that is from about 50% to about 80% greater than a thermoplastic elastomeric film without a styrenic block copolymer.

In particularly suitable embodiments, to further improve the strength of the thermoplastic elastomeric films of the present disclosure, the films may additionally include a strength enhancing agent. As used herein, "strength enhancing agent" refers to a physically compounded master batch or blend of organic polymers and up to 60% by weight inorganic particles, which can reinforce the blends of thermoplastic elastomer and styrenic block copolymer or make a stronger thermoplastic film in terms of increased tensile strength at break with a lower elongation at break without compromised elastic properties in terms of hysteresis and permanent set after 150% elongation.

Suitable strength enhancing agents include inorganic clays, and in suitable embodiments, include, for example, polymer grade montmorillonites, which are high purity aluminosilicate minerals referred to as phyllosilicates. Montmorillonites have a sheet-like or plate-like structure. Although their dimensions in the length and width directions can be measured in hundreds of nanometers, the mineral's thickness is only one nanometer. As a result, individual sheets have aspect ratios (length/width (1/w) or thickness/diameter (t/d)) varying from about 200 to about 1000, and in particularly suitable embodiments, from about 200 to about 400.

In some embodiments, the strength enhancing agents are inorganic clay particles such as Nanocor I.44P (available from Nanocor, Hoffman Estates, Ill.) having an average particle size of less than 20 microns in diameter, including from about 10 microns to about 15 microns in diameter, and in particularly suitably embodiments, are about 13 microns in diameter. In other embodiments, the strength enhancing agents are blends of inorganic clay and propylene such as Nanocor PP master batch (available from Nanocor, Hoffman Estates, Ill.).

The thermoplastic elastomeric films of the present disclosure include from about 2% to about 10% by weight strength enhancing agent, including from about 3% to about 8% by weight, and including from about 3% to about 5% by weight strength enhancing agent.

The thermoplastic elastomer films may further include processing aids and or tackifiers associated with the elastomer polymers as known in the film-making art.

As noted above, the thermoplastic elastomer films have improved tensile strength. The films have these improved properties without affecting the percent hysteresis or the percent set.

Surprisingly, the thermoplastic elastomeric films are substantially free of calcium carbonate. In this context, and unless otherwise specified, the term "substantially free" means that the thermoplastic elastomer films contain less than a functional amount of calcium carbonate, typically less than 1%, including less than 0.5%, including less than 0.1%, including less than 0.05%, including less than 0.015%, including less than 0.001%, and also including zero percent, by total weight of the thermoplastic elastomeric film.

In some embodiments, as these films are substantially free of filler particles such as calcium carbonate, the films are air impermeable. It should be understood however, in alternative embodiments, the films can be prepared to be breathable.

Methods of Strengthening Thermoplastic Elastomeric Films

The present disclosure is further directed to methods of strengthening thermoplastic elastomeric films by blending together a thermoplastic elastomer, and suitably, a polyolefin-based thermoplastic elastomer, and a styrenic block copolymer. In some embodiments, the methods further include adding strength enhancing agents, and in particular, small amounts of inorganic clays, to the blends of thermoplastic elastomer and styrenic block copolymer.

In a particular embodiment, the thermoplastic elastomeric film is strengthened by blending, in combination, greater than 50% by weight polyolefin-based thermoplastic film, from about 15% by weight to about 40% by weight styrenic block copolymer, and from about 2% by weight to about 10% by weight strength enhancing agent.

Typically, the thermoplastic elastomeric film, styrenic block copolymer, and, in some embodiments, strength enhancing agents are dry blended in twin screw extruders at a rate of from about 1 pound per hour to about 5 pounds per hour. The polymer melt is then extruded through a film die as known in the art, cooled, and collected to produce a thermoplastic elastomeric film having a basis weight of from about 20 grams per square meter (gsm) to about 200 gsm, including from about 30 gsm to about 100 gsm, and including from about 40 gsm to about 60 gsm and a thickness of from about 1 mil (0.025 mm) to about 8 mil (0.2 mm), including from about 2 mils (0.05 mm) to about 4 mils (0.1 mm), and including from about 2 mils (0.05 mm) to about 3 mils (0.076 mm).

Having described the disclosure in detail, it will be apparent that modifications and variations are possible without departing from the scope of the disclosure defined in the appended claims.

EXAMPLES

The following non-limiting Examples are provided to further illustrate the present disclosure.

Comparative Example 1

In this Example, comparative blends were prepared by dry blending various additive resins (30% by weight) with VISTAMAXX™ 6102 FL (70% by weight). The resin blend was fed directly into the feed section of a 16 mm Prism co-rotating twin screw extruder with 10 heated sections (temperature profile per section, beginning at the main feed section was 145° C., 150° C., 160° C., 165° C., 170° C., 175° C., 180° C., 180° C., and 180° C.) and a resin compounding screw design at a rate of 2 pounds/hour. Screw speed was constant at approximately 200 rpm. The melt pressure ranged between 30 psi and 50 psi with the extruder torque between 50% to 70%. The polymer melt was then extruded through an 8-inch film die, cooled to approximately 10° C. and collected at a take-up speed of 350 rpm so as to produce a thermoplastic elastomeric film having a base weight of approximately 40-60 gsm and being about 2-3 mils in thickness.

Physical properties, including tensile strength, percent hysteresis loss and present set, of the various blends were analyzed. Tensile strength was tested according to ASTM D882-10. Specifically, samples were cut in both the machine direction (MD) and cross direction (CD) using a 101.6 mm by 9.525 mm (4 inch by ⅜ inch) die and a gauge length of approximately 1 inch.

Percent hysteresis loss and percent set were measured at 50% elongation, 100% elongation and 150% elongation as described above, using the same sample dimensions as the above tensile strength testing.

The results for the control film and film based on various blends are shown for the machine direction (MD) in Table 1.

TABLE 1

| Physical Properties for 30% by weight Polymer Blends | | | | | | | | |
|---|---|---|---|---|---|---|---|---|
| | | | | Machine Direction Physical Properties | | | | |
| Polymer Components | | Film | | Elongation @ Break | Tensile Strength | Stress @ 150% Elongation | Energy Per Volume At Break | Hysteresis Loss @ 150% | Percent Set @ 150% |
| | | GSM | Thickness | | | | | | |
| 1 | 2 | (g/m²) | (mm) | % | MPa | MPa | J/cm³ | (%) | (%) |
| VMX 6102FL | | 50.1 | 0.055 | 809.2 | 15.4 | 2.5 | 47.3 | 41.1 | 15.3 |
| VMX 6102FL | KTN D1161 | 57.4 | 0.062 | 793.8 | 12.0 | 2.4 | 38.6 | 43.4 | 15.2 |
| VMX 6102FL | KTN D1102 | 56.8 | 0.060 | 881.2 | 18.0 | 3.2 | 61.9 | 56.0 | 8.8 |
| VMX 6102FL | KTN FG1901 | 69.9 | 0.075 | 875.6 | 18.7 | 3.3 | 64.6 | 46.0 | 8.6 |
| VMX 6102FL | KTN D1184 | 251.1 | 0.284 | 1198.8 | 14.9 | 2.8 | 76.3 | 51.1 | 13.9 |
| VMX 6102FL | KTN D1924 | 54.8 | 0.055 | 757.2 | 13.4 | 2.7 | 40.9 | 36.8 | 11.3 |
| VMX 6102FL | SIBS D1102 | 47.5 | 0.064 | 737.8 | 14.7 | 2.9 | 43.8 | 39.3 | 12.0 |
| VMX 6102FL | KTN MD6716 | 52.8 | 0.057 | 778.4 | 22.4 | 2.2 | 47.4 | 37.1 | 16.7 |
| VMX 6102FL | SPT 9827 | 45.5 | 0.050 | 699.2 | 15.6 | 2.8 | 41.5 | 44.4 | 15.1 |
| VMX 6102FL | SPT 8007 | 46.7 | 0.051 | 635.9 | 19.2 | 3.6 | 44.6 | 41.6 | 14.6 |
| VMX 6102FL | SLPR 9618 | 74.7 | 0.070 | 991.3 | 17.7 | 2.7 | 64.6 | 45.4 | 10.6 |
| VMX 6102FL | HYBR 7311 | 36.7 | 0.043 | 669.7 | 12.4 | 2.7 | 33.4 | 28.7 | 9.9 |
| VMX 6102FL | ENG 8407 | 66.1 | 0.079 | 779.6 | 12.1 | 2.7 | 40.9 | 42.3 | 12.2 |
| VMX 6102FL | ENG 8842 | 71.0 | 0.077 | 780.5 | 8.7 | 2.2 | 31.7 | 37.8 | 14.3 |
| VMX 6102FL | EXXON 7035 | 48.1 | 0.054 | 831.0 | 20.1 | 4.5 | 76.1 | 83.9 | 51.5 |
| VMX 6102FL | EXXON 9574 | 45.6 | 0.053 | 676.4 | 14.8 | 4.7 | 53.7 | 80.8 | 48.8 |
| VMX 6102FL | NOT 0040 | 76.3 | 0.078 | 922.9 | 17.5 | 2.6 | 59.2 | 49.9 | 12.4 |
| VMX 6102FL | NOT 3560 | 62.5 | 0.068 | 878.0 | 14.8 | 2.1 | 47.4 | 50.1 | 12.9 |
| VMX 6102FL | VER 4200 | 46.2 | 0.048 | 752.9 | 17.1 | 3.8 | 54.7 | 55.2 | 28.5 |
| VMX 6102FL | VER 3300 | 48.9 | 0.051 | 843.4 | 20.3 | 3.4 | 69.0 | 44.9 | 23.6 |

It can be seen that many of the resins tested improved tensile strength. Particularly, the styrenic block copolymer, Kraton MD6716 (KTN MD6716), showed substantially improved strength, increasing tensile strength while maintaining a low stress at 150% elongation and low hysteresis loss and percent set better than VISTAMAXX™ alone.

Comparative Example 2

In this Example, comparative blends with various levels of Kraton MD6716 were prepared by dry blending Kraton MD6716 with VISTAMAXX™ 6102 FL. The resin blend was fed directly into the feed section of the twin screw extruder as used in Comparative Example 1 at a rate of 2 pounds/hour. The polymer melt was then extruded as described for Comparative Example 1. Again the physical properties of the blends were tested as in Comparative Example 1. The results are shown in Table 2 and FIGS. 1-3.

TABLE 2

Kraton MD6716 Strength Enhancement

| Polymer Components | | Component Fraction | | Film | | Elongation @ Break | Tensile Strength | Stress @ 150% Elongation | Energy Per Volume At Break | Hysteresis Loss @ 150% | Percent Set @ 150% |
|---|---|---|---|---|---|---|---|---|---|---|---|
| 1 | 2 | 1 (%) | 2 (%) | GSM (g/m²) | Thickness (mm) | % | MPa | MPa | J/cm³ | (%) | (%) |
| VMX 6102FL | None | 100 | 0 | 50.1 | 0.055 | 809.2 | 15.4 | 2.5 | 47.3 | 41.0 | 15.0 |
| VMX 6102FL | KTN MD6716 | 90 | 10 | 56.6 | 0.065 | 794.4 | 21.3 | 2.5 | 53.6 | 41.0 | 12.3 |
| VMX 6102FL | KTN MD6716 | 82 | 20 | 60.3 | 0.062 | 700.1 | 20.3 | 2.7 | 45.4 | 39.2 | 13.4 |
| VMX 6102FL | KTN MD6716 | 70 | 30 | 53.1 | 0.058 | 759.2 | 22.7 | 2.3 | 50.0 | 37.8 | 12.8 |
| VMX 6102FL | KTN MD6716 | 60 | 40 | 57.9 | 0.069 | 734.0 | 18.2 | 2.2 | 41.1 | 35.5 | 12.1 |
| VMX 6102FL | KTN MD6716 | 50 | 50 | 67.4 | 0.069 | 794.9 | 24.6 | 2.1 | 50.7 | 33.2 | 12.0 |
| VMX 6102FL | KTN MD6716 | 30 | 70 | 58.8 | 0.063 | 748.5 | 26.8 | 1.9 | 47.5 | 27.1 | 11.9 |
| None | KTN MD6716 | 0 | 100 | 58.9 | 0.061 | 763.6 | 27.0 | 1.7 | 43.6 | 15.4 | 6.8 |

Figure 1:
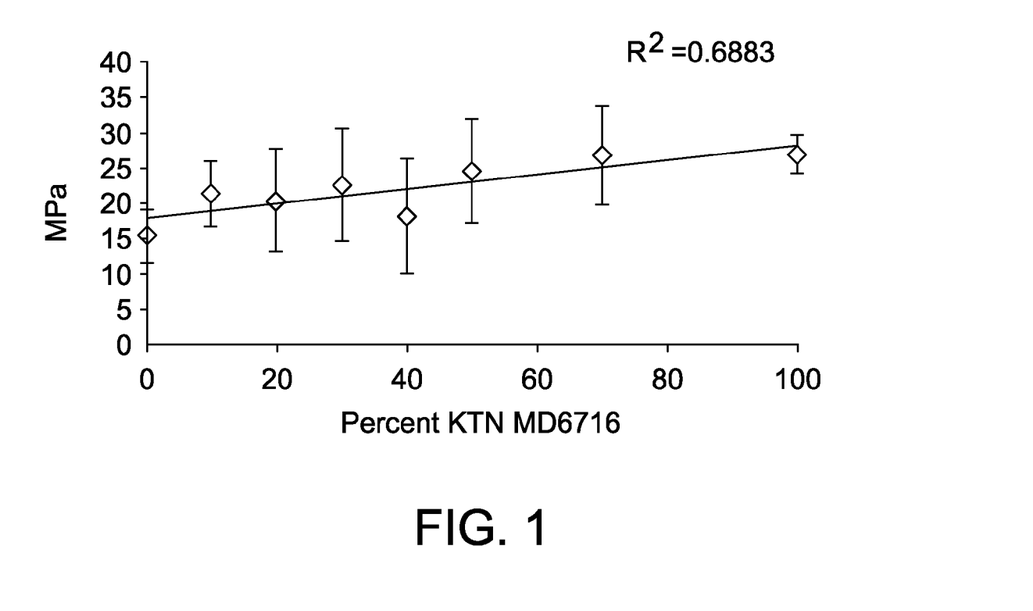
FIG. 1 is a graph depicting the effect of increasing styrenic block copolymer concentration on the tensile strength of thermoplastic elastomeric films as analyzed in Comparative Example 2.
Figure 2:
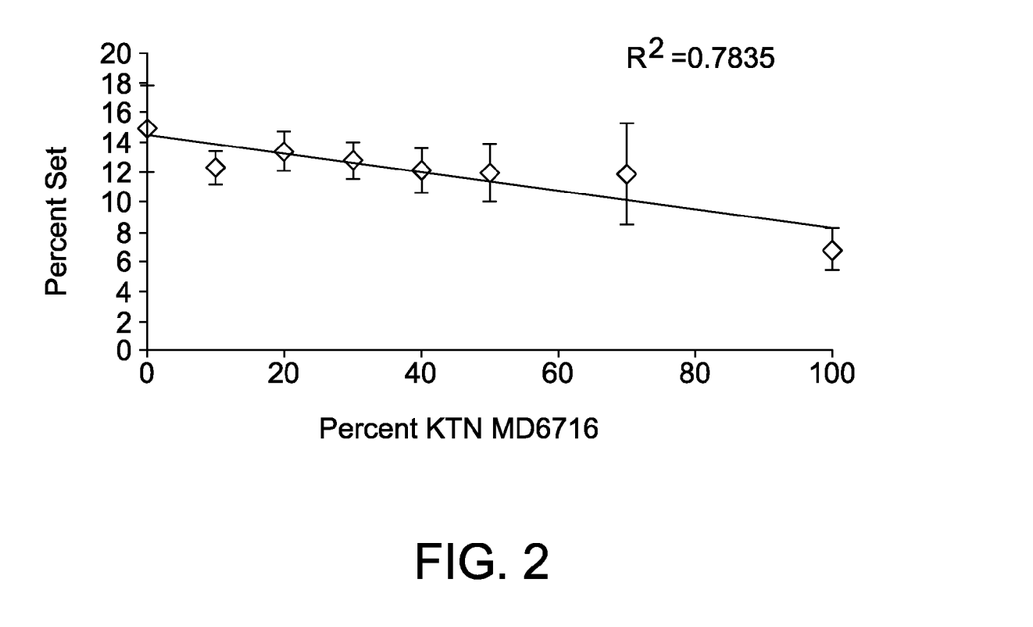
FIG. 2 is a graph depicting the effect of increasing styrenic block copolymer concentration on the percent set of thermoplastic elastomeric films as analyzed in Comparative Example 2.
Figure 3:
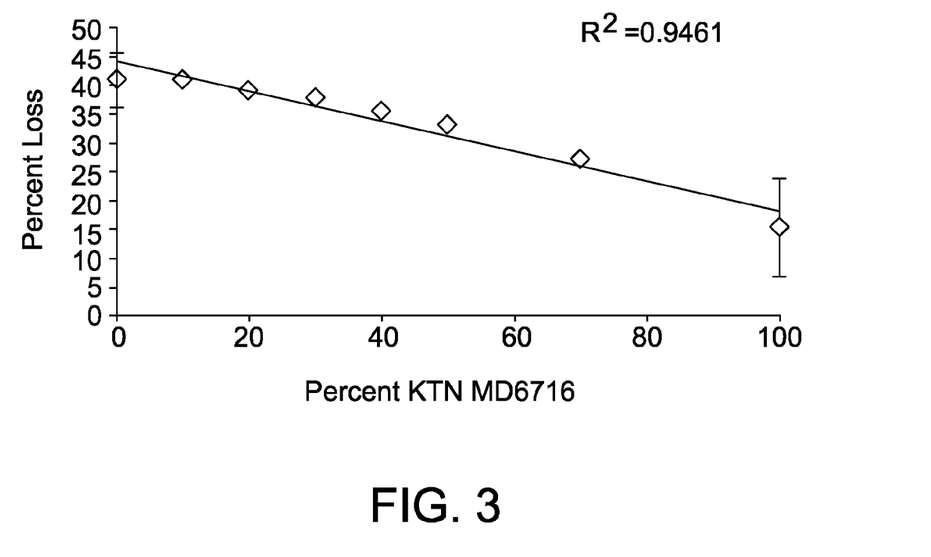
FIG. 3 is a graph depicting the effect of increasing styrenic block copolymer concentration on the percent hysteresis loss of thermoplastic elastomeric films as analyzed in Comparative Example 2.

As shown in the above Table and FIGS. 1-3, increasing the amount of Kraton MD6716 increased tensile strength in a linear fashion as well as decreased hysteresis loss and percent set.

Example 1

In this Example, the tensile strength of a thermoplastic elastomeric film of the present disclosure was compared to a thermoplastic elastomeric film without a styrenic block copolymer.

70% by weight VISTAMAXX™ 6102 was blended with 30% by weight Kraton MD6716. The tensile strength of the prepared thermoplastic elastomer film including SEPS was measured and compared to the tensile strength of VISTAMAXX™ 6102 alone.

The single resin and resin blend were fed directly into the feed section of the twin screw extruder as described in Comparative Example 1. The resulting polymer melt was then extruded through the film die, cooled and collected so as to produce film around 40-60 gsm and 2-3 mils in thickness as described in Comparative Example 1.

Figure 4:
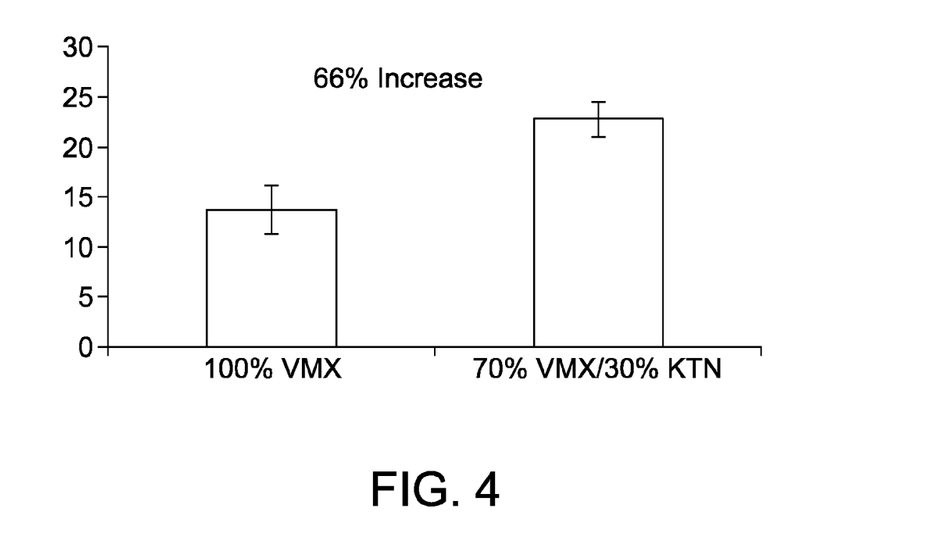
FIG. 4 is a graph depicting the average increase in tensile strength by the addition of a styrenic block copolymer to the polyolefin-based thermoplastic elastomer as analyzed in Example 1.

The tensile strength was measured of all samples and, as shown in FIG. 4, the average increase in tensile strength with the addition of the Kraton MD6716 was approximately 66%.

Example 2

In this Example, a strength enhancing agent was added to the thermoplastic film of Example 1 including the combination of polyolefin-based thermoplastic elastomer and styrenic block copolymer. More particularly, various levels of inorganic clay/VISTAMAXX™ 6102 FL master batch were added to VISTAMAXX™ alone and in the VISTAMAXX™/Kraton MD6716 blend. Again, tensile strength was measured.

The inorganic clay/VISTAMAXX™ master batch was produced by adding clay particles at 40% loading in the VISTAMAXX™ 6102 resin using a 30 mm ZSK-30 co-rotating twin screws extruder with 7 heated sections and a resin compounding screw design. Resins were produced at a rate of 20 pounds per hour and a screw speed of 140 rpm. VISTAMAXX™ 6102 was fed through the main feed section. Clay was fed into the polymer melt at section 4. The temperature profile per section, beginning at the main feed section was 170° C., 175° C., 175° C., 180° C., 180° C., 182° C., and 185° C. The melt pressure was 190 psi with the extruder torque of 70%. The extruded polymer was brown in color and flowed well from the die. The strands were cooled and pelletized.

The master batch and resin were dry blended and fed directly into the feed section of the twin screw extruder and then extruded as described in Comparative Example 1. The resulting films had basis weights of 40-60 gsm and were approximately 2-3 mils thick.

Figure 5:
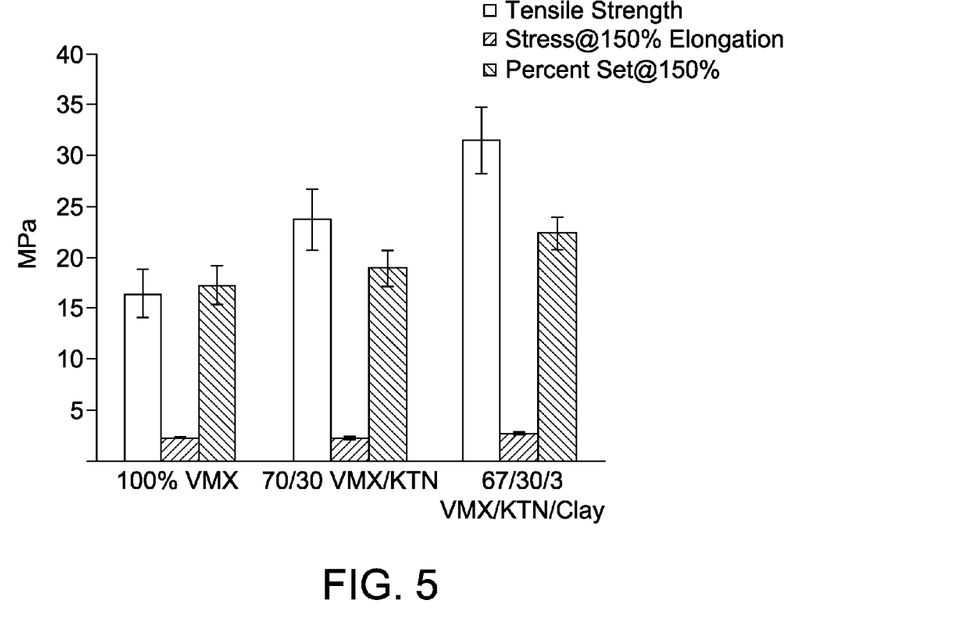
FIG. 5 is a graph depicting the strength enhancement and other physical properties by styrenic block copolymer and/or clay addition to blends of polyolefin-based thermoplastic elastomers as analyzed in Example 2.

The tensile strength was measured of all samples and, as shown in FIG. 5, the ability of the inorganic clay to further enhance the strength of the polyolefin-based thermoplastic elastomer was found to only occur in the presence of styrene block copolymer, especially with Kraton MD6716. Particularly, clay addition increased tensile strength by 90-100% over VISTAMAXX alone.

Figure 6:
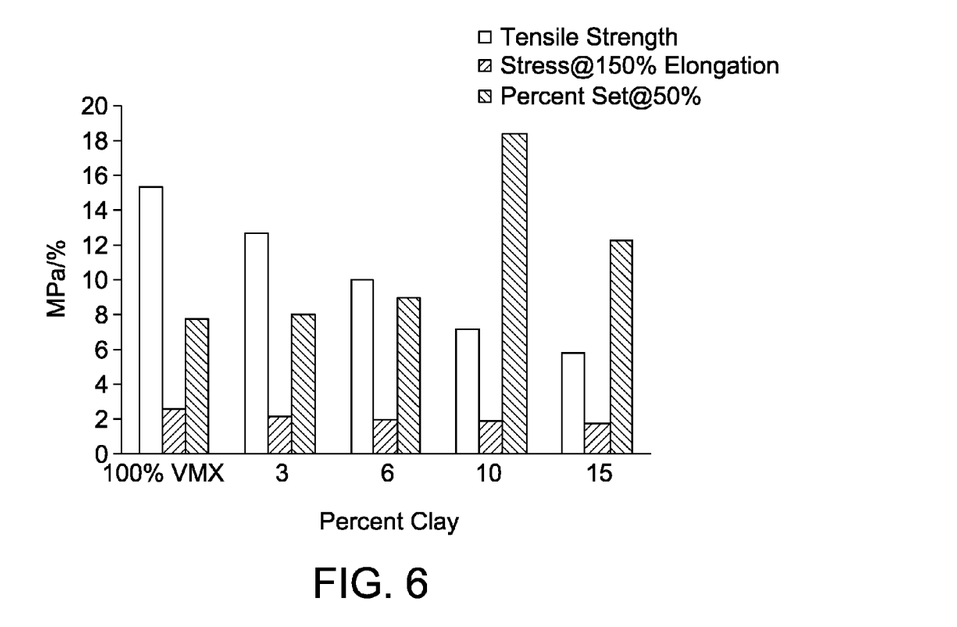
FIG. 6 is a graph depicting the effect of clay addition on the physical properties of polyolefin-based thermoplastic elastomer in the absence of styrenic block copolymer as analyzed in Example 2.
Figure 7:
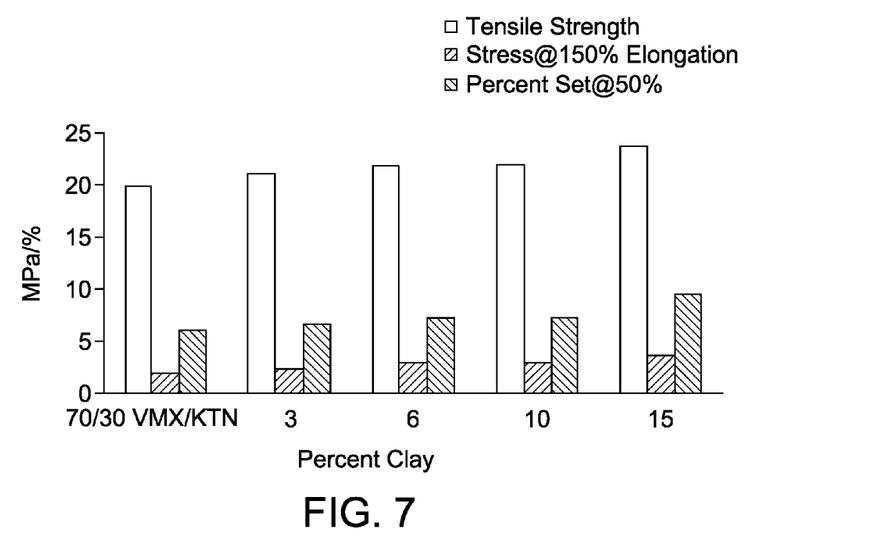
FIG. 7 is a graph depicting the effect of the concentration of clay addition on the physical properties of blends of polyolefin-based thermoplastic elastomer/styrenic block copolymer as analyzed in Example 2.

Further, as shown in FIGS. 6 and 7, it was surprisingly found that when clay particles were added to the VISTAMAXX™ alone, the tensile strength decreased. However, in the presence of VISTAMAXX™ and styrene block copolymer e.g., Kraton together, the tensile strength was further improved by the presence of clay over the combination of VISTAMAXX™ and Kraton.

This further shows the unexpected improved strength achieved by using a combination of polyolefin-based thermoplastic elastomer, styrenic block copolymer, and strength enhancing agent. That is, as shown in the Examples, the addition of clay to the polyolefin-based thermoplastic elastomer without the styrenic block copolymer was weaker than the polyolefin-based thermoplastic elastomer alone. However, when the polyolefin-based thermoplastic elastomer and clay were further combined with the styrenic block copolymer there was an unexpected substantial increase in the resulting thermoplastic elastomeric film's strength. That increase in strength was further greater than the strength obtained with a polyolefin-based thermoplastic elastomer/styrenic block copolymer-blended film.

Example 3

In this Example, the tensile strength of the blend of VISTAMAXX™/Kraton MD6716 of Example 2 in combination with other inorganic clay master batches was measured. Particularly, various levels of Nanocor PP, clay/polypropylene master batch, (Nanocor, Hoffman Estates, Ill.) was added to VISTAMAXX™ alone and in the 70/30 VISTAMAXX™/Kraton MD 6716 blends. The master batch and resin were dry blended and fed directly into the feed section of the twin screw extruder at a rate of 2 pounds/hour. The polymer melt was extruded through a film die, cooled and collected so as to produce film around 40-gsm and 2-3 mil thickness as described for the previous Examples. Again, the physical properties of the resulting films were measured. The results are shown in FIGS. 8 and 9.

Figure 8:
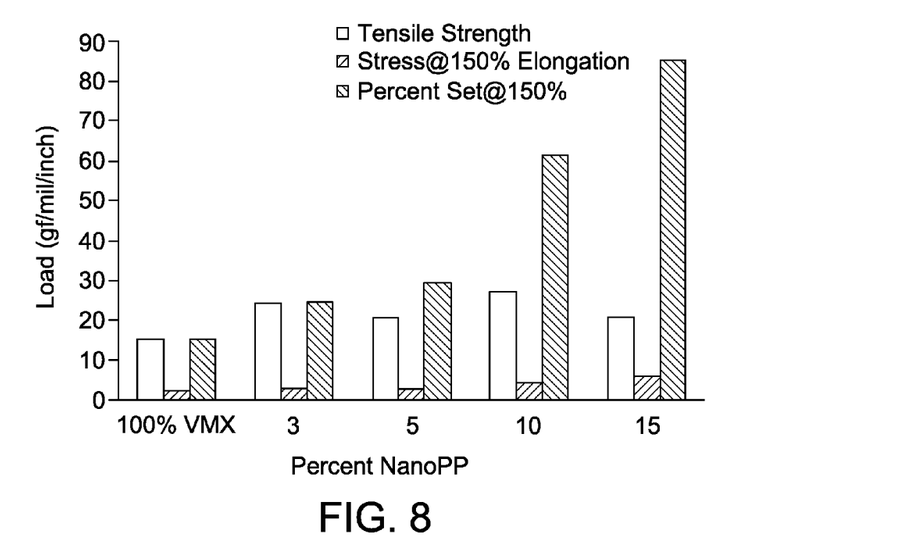
FIG. 8 is a graph depicting the effect of clay addition on the physical properties of polyolefin-based thermoplastic elastomer alone and with various concentrations of clay addition as analyzed in Example 3.
Figure 9:
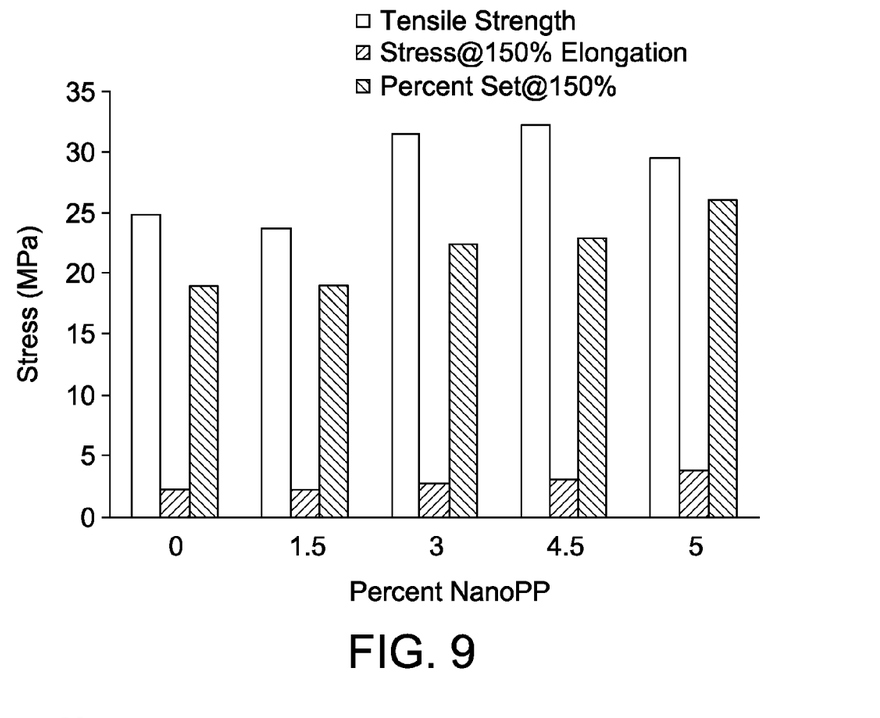
FIG. 9 is a graph depicting the effect of the concentration of clay addition on the physical properties of blends of polyolefin-based thermoplastic elastomer/styrenic block copolymer as analyzed in Example 3.

As shown in FIGS. 8 and 9, VISTAMAXX™ and the VISTAMAXX™/Kraton MD 6716 blend were strengthened using the commercially available clay master batch. In this master batch the clay particles were suspended in a polypropylene resin at a 50% blend. In this case, the strengthening is clearly enhanced in the VISTAMAXX™/Kraton MD 6716 blend over VISTAMAXX™ alone.

Example 4

In this Example, the tensile strength of the blend of VISTAMAXX™/Kraton MD6716 of Example 2 in combination with calcium carbonate was measured. Particularly, various levels of calcium carbonate, (available from Omya North America, Cincinnati, Ohio) was added to VISTAMAXX™ alone and in the 70/30 VISTAMAXX™/Kraton MD 6716 blends. The calcium carbonate and resin were dry blended and fed directly into the feed section of the twin screw extruder at a rate of 2 pounds/hour. The polymer melt was extruded through a film die, cooled and collected so as to produce film around 40-60 gsm and 2-3 mil thickness as described for the previous Examples. Again, the physical properties of the resulting films were measured. The results are shown in FIG. 10.

Figure 10:
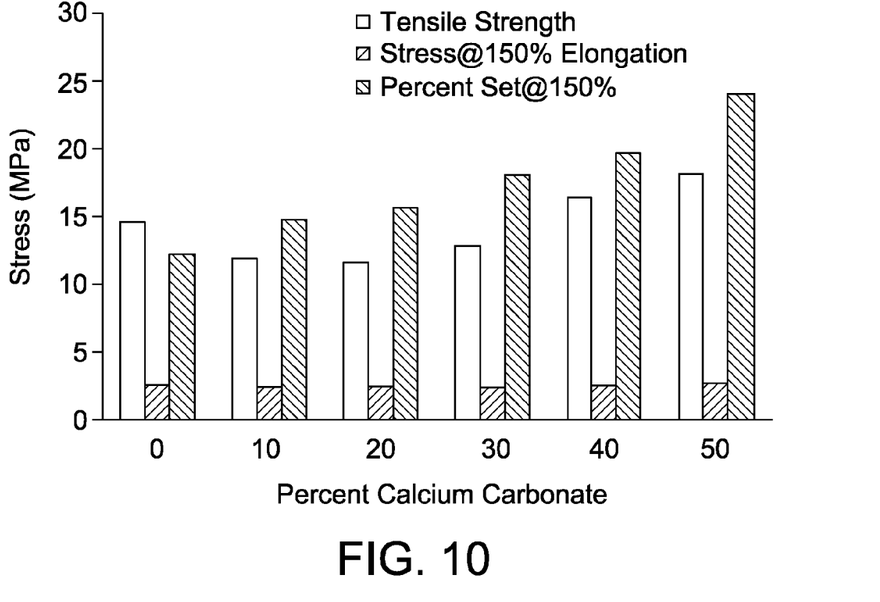
FIG. 10 is a graph depicting the effect of the concentration of calcium carbonate on the physical properties of blends of polyolefin-based thermoplastic elastomer/styrenic block copolymer as analyzed in Example 4.

As shown in FIG. 10, the tensile strength enhancement of the VISTAMAXX™/Kraton MD 6716 blend was not accomplished by the addition of calcium carbonate.

What is claimed is:

1. A personal care product comprising a thermoplastic elastomeric film comprising greater than 65% by weight of a polyolefin-based thermoplastic elastomer, a styrenic block copolymer, and from about 3% to about 8% by weight of a strength-enhancing agent.

2. The personal care product as set forth in claim 1 wherein the polyolefin-based thermoplastic elastomer comprises a homopolymer or a copolymer of an α-olefin having 1 to 12 carbon atoms.

3. The personal care product as set forth in claim 1 wherein the styrenic block copolymer is selected from the group consisting of styrene-ethylenepropylene-styrene (SEPS), styrene-ethylenepropylene-styrene-ethylenepropylene (SEPSEP), styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), styrene-ethylene-ethylenepropylene-styrene (SEEPS), hydrogenated vinyl-polyisoprene/hydrogenated polyisoprene/polystyrene and combinations thereof.

4. The personal care product as set forth in claim 1 wherein the styrenic block copolymer is styrene-ethylenebutylene-styrene (SEBS).

5. The personal care product as set forth in claim 1 comprising from about 15% by weight to about 30% by weight styrenic block copolymer.

6. The personal care product as set forth in claim 1 wherein the strength-enhancing agent is inorganic clay.

7. The personal care product as set forth in claim 1 wherein the strength-enhancing agent has an aspect ratio of from about 200 to about 1000.

8. The personal care product as set forth in claim 1, wherein the film is substantially free of calcium carbonate.

9. The personal care product as set forth in claim 1 having a tensile strength of from about 40% to about 100% greater than a thermoplastic elastomeric film without a styrenic block copolymer.

10. The personal care product as set forth in claim 1 being a single layer film.

11. A personal care product comprising a thermoplastic elastomeric film comprising greater than 65% by weight polyolefin-based thermoplastic elastomers, from about 15% by weight to about 30% by weight styrenic block copolymer, and from about 3% by weight to about 8% by weight strength-enhancing agent.

12. The personal care product as set forth in claim 11 wherein the polyolefin-based thermoplastic elastomer comprises a homopolymer or a copolymer of an α-olefin having 1 to 12 carbon atoms.

13. The personal care product as set forth in claim 11 wherein the styrenic block copolymer is selected from the group consisting of styrene-ethylenepropylene-styrene (SEPS), styrene-ethylenepropylene-styrene-ethylenepropylene (SEPSEP), styrene-ethylenebutylene-styrene (SEBS), styrene-ethylenebutylene-styrene-ethylenebutylene (SEBSEB), styrene-butadiene-styrene (SBS), styrene-isoprene-styrene (SIS), styrene-isoprene-butadiene-styrene (SIBS), styrene-ethylene-ethylenepropylene-styrene (SEEPS), hydrogenated vinyl-polyisoprene/hydrogenated polyisoprene/polystyrene and combinations thereof.

14. The personal care product as set forth in claim 11 wherein the strength-enhancing agent is inorganic clay.

15. The personal care product as set forth in claim 11 wherein the strength-enhancing agent has an aspect ratio of from about 200 to about 1000.

16. A method of strengthening a thermoplastic elastomeric film of a personal care product, the method comprising blending greater than 65% by weight of a polyolefin-based thermoplastic elastomer, a styrenic block copolymer, and from about 3% to about 8% by weight of an inorganic clay.

17. The method as set forth in claim 16 comprising blending from about 15% by weight to about 30% by weight styrenic block copolymer.

18. The method as set forth in claim 16 wherein the film is substantially free of calcium carbonate.

19. The personal care product as set forth in claim 1 wherein the styrenic block copolymer is styrene-ethylenepropylene-styrene (SEPS).

20. The method as set forth in claim 16 wherein the styrenic block copolymer is styrene-ethylenepropylene-styrene (SEPS).

* * * * *